US010787371B2

(12) United States Patent
Arah

(10) Patent No.: US 10,787,371 B2
(45) Date of Patent: Sep. 29, 2020

(54) REVERSIBLE FILTRATION SYSTEM

(71) Applicant: Alijah Christopher Arah, New York, NY (US)

(72) Inventor: Alijah Christopher Arah, New York, NY (US)

(73) Assignee: Alijah Christopher Arah, New York, NY (US)

( * ) Notice: Subject to any disclaimer, the term of this patent is extended or adjusted under 35 U.S.C. 154(b) by 21 days.

(21) Appl. No.: 15/627,551

(22) Filed: Jun. 20, 2017

(65) Prior Publication Data

US 2017/0283281 A1     Oct. 5, 2017

Related U.S. Application Data

(62) Division of application No. 14/308,758, filed on Jun. 19, 2014, now Pat. No. 9,725,333.

(60) Provisional application No. 61/943,282, filed on Feb. 21, 2014.

(51) Int. Cl.
| | | |
|---|---|---|
| *B01D 61/18* | (2006.01) | |
| *B01D 63/02* | (2006.01) | |
| *C02F 1/00* | (2006.01) | |
| *C02F 1/44* | (2006.01) | |

(52) U.S. Cl.
CPC .............. *C02F 1/003* (2013.01); *B01D 61/18* (2013.01); *B01D 63/024* (2013.01); *B01D 2313/44* (2013.01); *C02F 1/444* (2013.01); *C02F 2201/004* (2013.01); *C02F 2201/006* (2013.01); *C02F 2307/04* (2013.01)

(58) Field of Classification Search
CPC ................................................. A45F 2003/163
See application file for complete search history.

(56) References Cited

U.S. PATENT DOCUMENTS

| | | |
|---|---|---|
| 4,605,500 A | 8/1986 | Takemura et al. |
| 4,735,716 A | 4/1988 | Petrucci et al. |
| 4,764,274 A | 8/1988 | Miller |
| 4,876,006 A | 10/1989 | Ohkubo et al. |
| 5,028,077 A | 7/1991 | Hurst |
| 5,158,581 A | 10/1992 | Coplan |

(Continued)

OTHER PUBLICATIONS

PureEarth Technologies Inc., PureEarth Backwashing KDF/GAC Whole House Water Filter for Municipal Water, Oct. 25, 2008, pp. 1-3 (Year: 2008).*

(Continued)

*Primary Examiner* — Bobby Ramdhanie
*Assistant Examiner* — Michael J An
(74) *Attorney, Agent, or Firm* — Alix, Yale & Ristas, LLP

(57) ABSTRACT

A reversible fluid filtration system includes a receiver unit and a fluid filtration unit. The receiver unit has a first side and second side with a fluid channel therebetween. The fluid filtration unit includes filter media positioned between a first end and a second end. Openings in the first end are fluidly connected with the openings in the second end via the filter media. The first end and second end are independently attachable to the receiver unit via the second side. Attachment of the filtration unit first end to the receiver unit allows filtration of fluid entering the receiver unit fluid channel. Attachment of the filtration unit second end to the receiver unit allows fluid entering the receiver unit to remove solid material from the filter media and recharge the filter media.

20 Claims, 7 Drawing Sheets

(56) References Cited

U.S. PATENT DOCUMENTS

| | | | |
|---|---|---|---|
| 5,225,078 A | 7/1993 | Polasky et al. | |
| 5,503,742 A | 4/1996 | Farley | |
| 5,846,416 A | 12/1998 | Gullett | |
| 6,569,329 B1 | 5/2003 | Nohren, Jr. | |
| 6,626,378 B2 * | 9/2003 | Sasaki | A47K 3/283 |
| | | | 239/200 |
| 6,632,358 B1 | 10/2003 | Suga et al. | |
| 7,325,579 B2 | 2/2008 | Harding | |
| 7,972,510 B2 | 7/2011 | Morita et al. | |
| 8,043,502 B2 | 10/2011 | Nauta | |
| 8,080,160 B2 | 12/2011 | Yanou et al. | |
| 8,177,971 B2 | 5/2012 | Bittle et al. | |
| 8,257,590 B2 | 9/2012 | Taniguchi et al. | |
| 8,307,991 B2 | 11/2012 | Morikawa et al. | |
| 2002/0152549 A1 * | 10/2002 | Kanaya | E03D 1/32 |
| | | | 4/366 |
| 2004/0245174 A1 * | 12/2004 | Takayama | B01D 61/18 |
| | | | 210/636 |
| 2005/0035041 A1 | 2/2005 | Nohren, Jr. et al. | |
| 2006/0249442 A1 | 11/2006 | Yap et al. | |
| 2007/0163942 A1 | 7/2007 | Tanaka et al. | |
| 2008/0017565 A1 | 1/2008 | Yanou et al. | |
| 2008/0105618 A1 | 5/2008 | Beckius et al. | |
| 2008/0110820 A1 * | 5/2008 | Knipmeyer | C02F 1/003 |
| | | | 210/474 |
| 2010/0219122 A1 | 9/2010 | Ogawa et al. | |
| 2010/0320135 A1 | 12/2010 | Sun | |
| 2012/0012515 A1 | 1/2012 | Nauta | |

OTHER PUBLICATIONS

Sawyer Personal Water Bottle with Filter; product description; Sawyer Products, Inc.; http://sawyer.com/products/sawyer-personal-water-bottle-filter/.

PUR Faucet Water Filters; Kaz USA, Inc.; http://www.purwater.com/water/pur-products/faucet-water-filter/.

* cited by examiner

REVERSIBLE FILTRATION SYSTEM

CROSS-REFERENCE TO RELATED APPLICATIONS

This application is a divisional of U.S. patent application Ser. No. 14/308,758, filed on Jun. 19, 2014, entitled "Fluid Vessel With Removable and Reversible Filtration Unit," which claims priority to U.S. Provisional Application No. 61/943,282, filed on Feb. 21, 2014, entitled "Pitcher With Filtration," the disclosures of which are incorporated herein by reference in their entireties.

BACKGROUND

The present disclosure relates generally to residential fluid filtration systems, and more particularly, to high capacity vessels, water bottles or similar devices with a filtration unit having an inlet portion for forming a fluid tight seal with a fluid source and the corresponding filtration unit, as well as the filtration unit itself.

One common type of filtered water pitcher uses charcoal activated filters and includes a pitcher having an upper reservoir to which the filter is connected. The water drains through the filter by gravity into a bottom reservoir. With this type of device, the filter cartridge must be replaced when it becomes dirty. Also, the pitcher cannot be fully filled because of the upper reservoir, and because it relies upon gravity, it takes a relatively long period of time to produce a pitcher full of filtered water. Many additional products exist that use similar types of filtration technology.

SUMMARY

According to one aspect of the disclosure, a reversible fluid filtration system is provided with a receiver unit and a fluid filtration unit. The receiver unit includes a first side and an opposite second side and defines a fluid channel. The first side has a first sealing member configured for releasable engagement with a fluid delivery unit connected to a fluid source. The fluid filtration unit has a first end configured for removable attachment to the receiver unit at the second side and a second end. A filtration channel is defined between the first end and second end. The first end defines a filter inlet and the second end defines a filter outlet. A unit of filter media is positioned between the first and second ends with the filter outlet in fluid communication with the fluid channel when the first end is attached to the receiver unit. When the first sealing member is engaged with the fluid delivery unit and the fluid source is under pressure, the fluid from the fluid source is forced through the filter media in a first direction and from the filter outlet. The second end of the fluid filtration unit is configured for removable attachment to the receiver unit via the second side, thereby allowing the fluid filtration unit to be reversed whereupon fluid from the fluid source under pressure is forced through the filter media in a second direction opposite of the first direction, thereby removing at least a portion of material present on the filtration media.

In another embodiment, a reversible fluid filtration system includes a receiver unit and a filtration unit. The receiver unit defines a fluid channel extending from a first side to a second side and a fluid inlet on the first side connected to the fluid channel. The filtration unit includes a solid side wall circumscribing an axis defining a flow chamber. The side wall extends between and each of a first perforate end cap and a second perforate end cap and is sealingly connected to the end caps. A plurality of porous hollow fiber membranes are positioned within the flow chamber in fluid communication with the perforate portions of the first and second end caps. The first and second end caps each includes a sealing member. Each of the first and second end caps is respectively configured for independent releasable fluid tight attachment to the receiver unit via the second side. The filtration unit may thus be fluidly connected to the fluid inlet through the fluid channel via either the first or second end cap, which fluidly connects the inlet with the perforate portions of the attached end cap and the perforate portions of the opposite end cap through the plurality of porous hollow fiber membranes.

In yet another embodiment, a reversible fluid filtration system is provided having a receiver unit and a fluid filtration unit. The receiver unit has a first side and an opposite second side and defines a fluid channel. The first side includes a first sealing member configured for releasable engagement with a fluid delivery unit connected to a fluid source. The fluid filtration unit extends in an axial direction between a first end cap and a second end cap. A filtration channel is defined between the respective end caps. The first end cap has an outer area portion with openings and an inner area portion that is solid. The second end cap has an outer area portion that is solid and an inner area portion with openings. The fluid filtration unit includes filter media extending from the inner area portion of the first end cap to the inner area portion of the second end cap. The first end cap openings are fluidly connected to the second end cap openings through the filter media. The first end cap and second end cap are each configured to independently attach to the receiver unit via the second side thereby forming a substantially fluid tight connection between the fluid channel and the respective openings in the first end cap and second end cap through the filtration media when either of the first end cap or the second end cap is attached to the receiver unit.

BRIEF DESCRIPTION OF THE DRAWINGS

Aspects of the preferred embodiment will be described in reference to the drawings in which.

DETAILED DESCRIPTION

Figure 1:
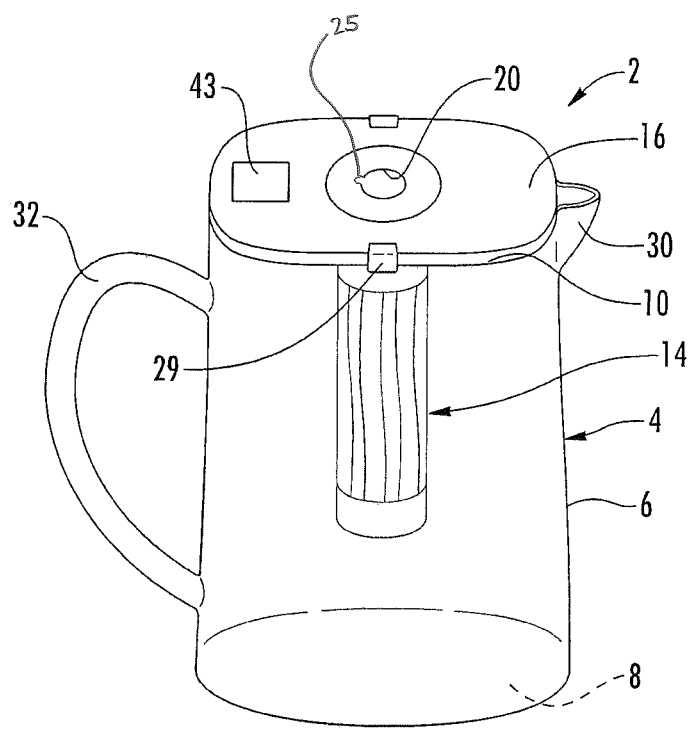
FIG. 1 is a perspective view of a fluid pitcher assembly with the filtration unit as disclosed herein.

Referring to the drawings, wherein like numerals represent like elements throughout, and particularly FIG. 1, there is shown a fluid storage and dispensing assembly 2 including a fluid chamber or reservoir 4 in the form of a water pitcher that is defined by a side wall 6, a closed bottom end 8 and a spaced upper open end 10. A lid 12 is removably connected to the sidewall 6 proximate the upper end. A fluid filtration unit 14 is removably affixed to the underside of the lid and extends into the reservoir 4.

More specifically, the lid 12 includes a first surface 16 forming the outside of the lid and a second surface 18 forming the inside or underside of the lid 12. A fluid inlet 20 is provided in the lid 12 between the two surfaces 16 and 18. The fluid inlet 20 has an axis parallel to the axis of the side wall 6 of the reservoir 4.

Figure 5:
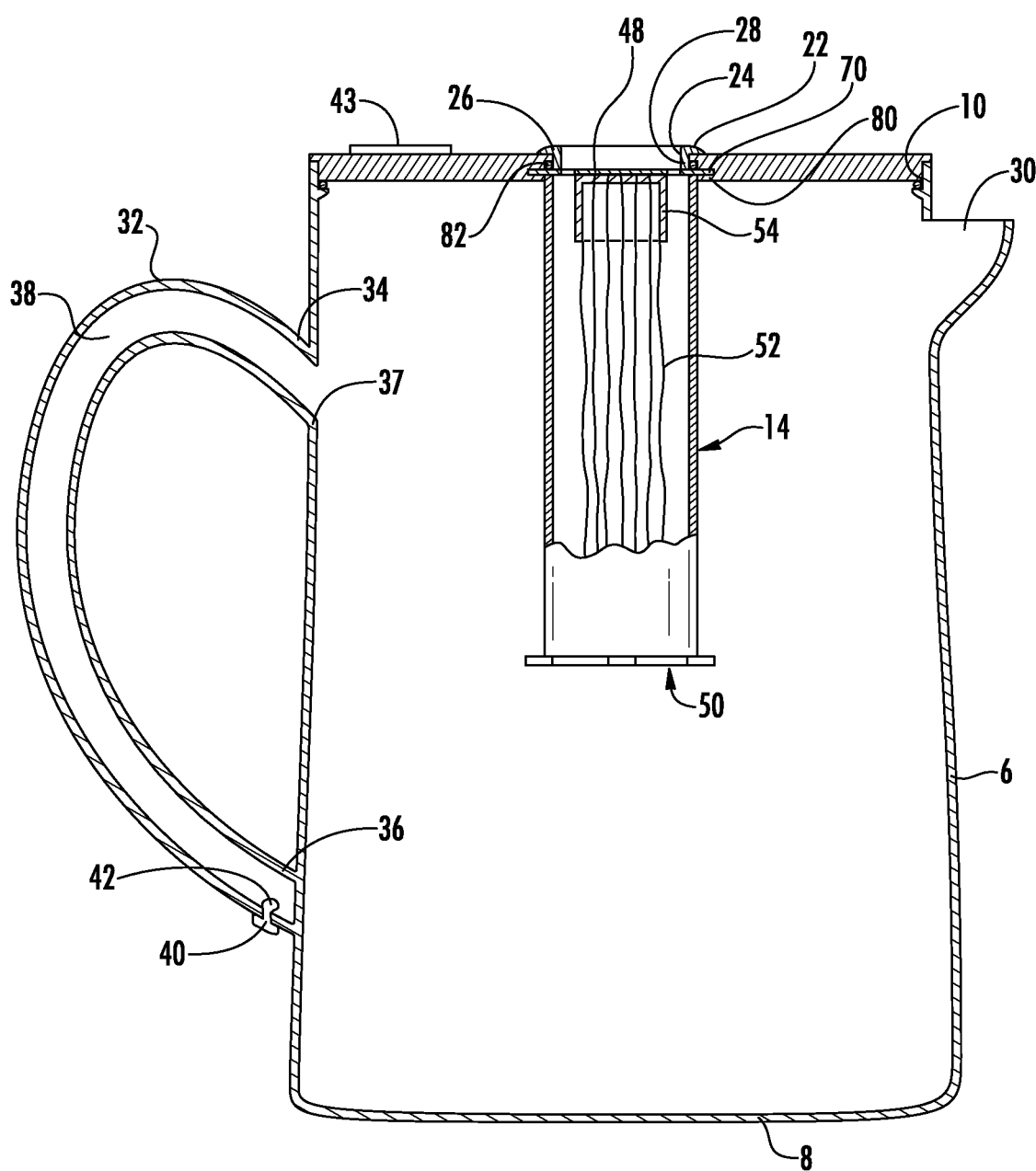
FIG. 5 is a vertical cross sectional view of the pitcher assembly of FIG. 1.
Figure 5A:
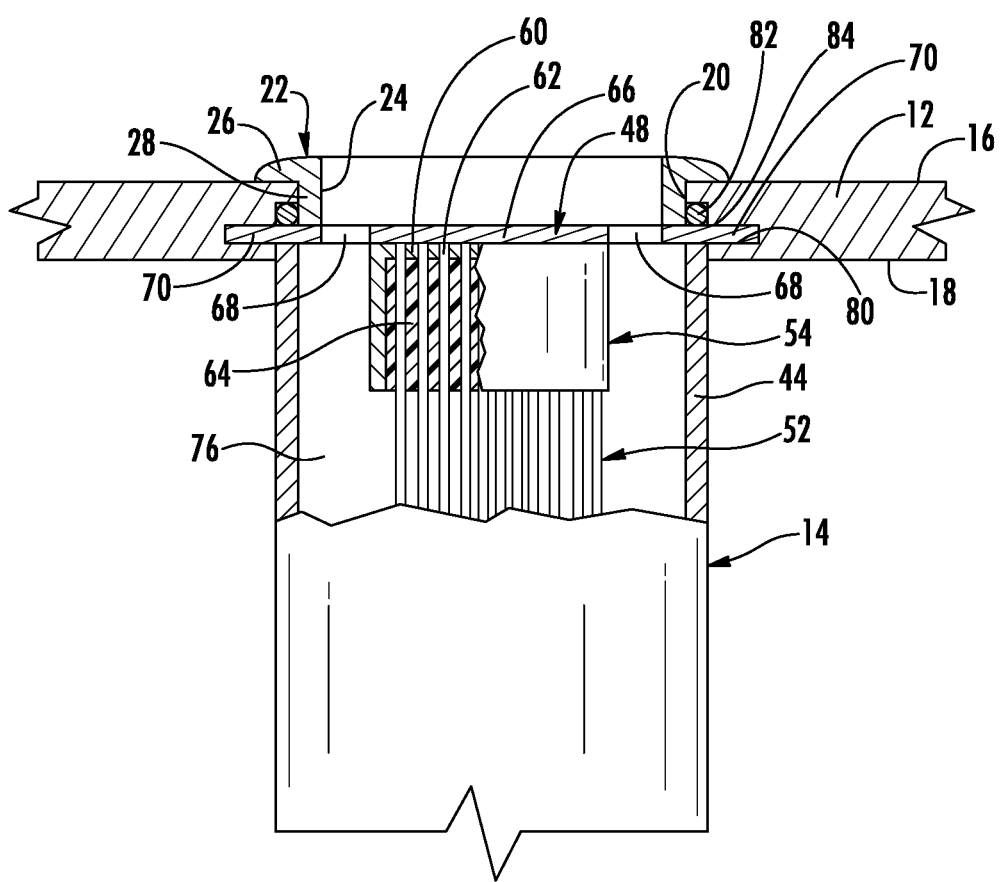
FIG. 5A is an enlarged cross sectional view of the connection between the filter unit and the lid of the pitcher.

As shown in FIG. 5, a fluid sealing member 22 with a central aperture 24 is mounted in the fluid inlet 20. The fluid sealing member 22 may be in the form of a rubber gasket having a flange 26 positioned against the outside 16 of the lid 12 and a tubular body portion 28 extending down from the flange 26 into the fluid inlet 20. The fluid sealing member 22 is designed to provide a releasable attachment to the outlet of a source of pressurized fluid such a faucet and provide a fluid tight seal therebetween. A pair of spaced clamps 29 may be provided on the side of the lid 12 to attach to a suitable projection (not shown) on the side wall 6 of the pitcher to clamp the lid 12 to the pitcher 4.

The pitcher 4 includes a pouring spout 30 at the upper end of the side wall 6. A handle 32 is affixed to the side wall 6 having an upper first end 34 affixed to the side wall 6 at a point slightly spaced downward from the open end 10 of the pitcher 4 and a lower end 36 connected to the pitcher at a point spaced upwardly from the bottom end 8. As shown in FIG. 5, the handle 32 is hollow with the interior 38 of the handle communicating with the interior of the pitcher at the upper end 34 through an opening 37 in the side wall 6. The lower end 36 of the handle 32 is closed. A drain hole 40 is provided in the handle 32 adjacent the lower end 36. A removable plug 42 may be provided in the drain hole 40 for closing the drain hole 40 during regular use of the pitcher. The plug 42 may be removed when filling the pitcher through the filter unit 14 so that the liquid in the reservoir will not rise to a point where it could separate the lid from the reservoir under the pressure of the incoming fluid. With the plug 42 removed, when the fluid level rises to the point where the upper end 34 of the handle opens to the interior of the pitcher 4, the fluid will flow out of the interior of the pitcher 4 into the interior 38 of the handle 32 and down through the drain hole 40 at the bottom of the handle 32. A timer 43 may be mounted in the lid 12 to keep track of filter use.

Figures 3, 3A:
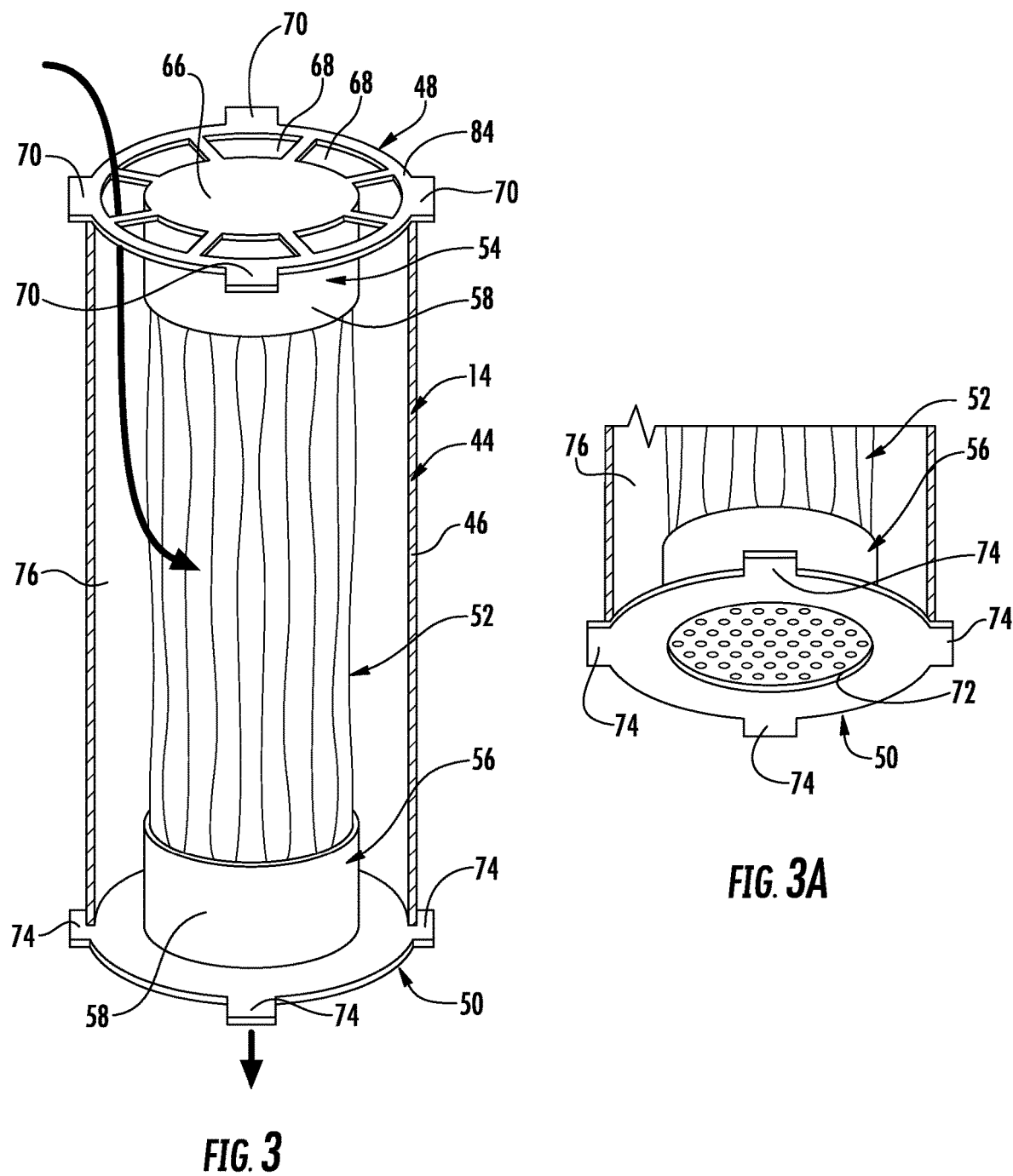
FIG. 3 is a perspective view of the filter unit of FIG. 1.
FIG. 3A is a perspective view looking up at the filter unit of FIG. 3.
Figure 3B:
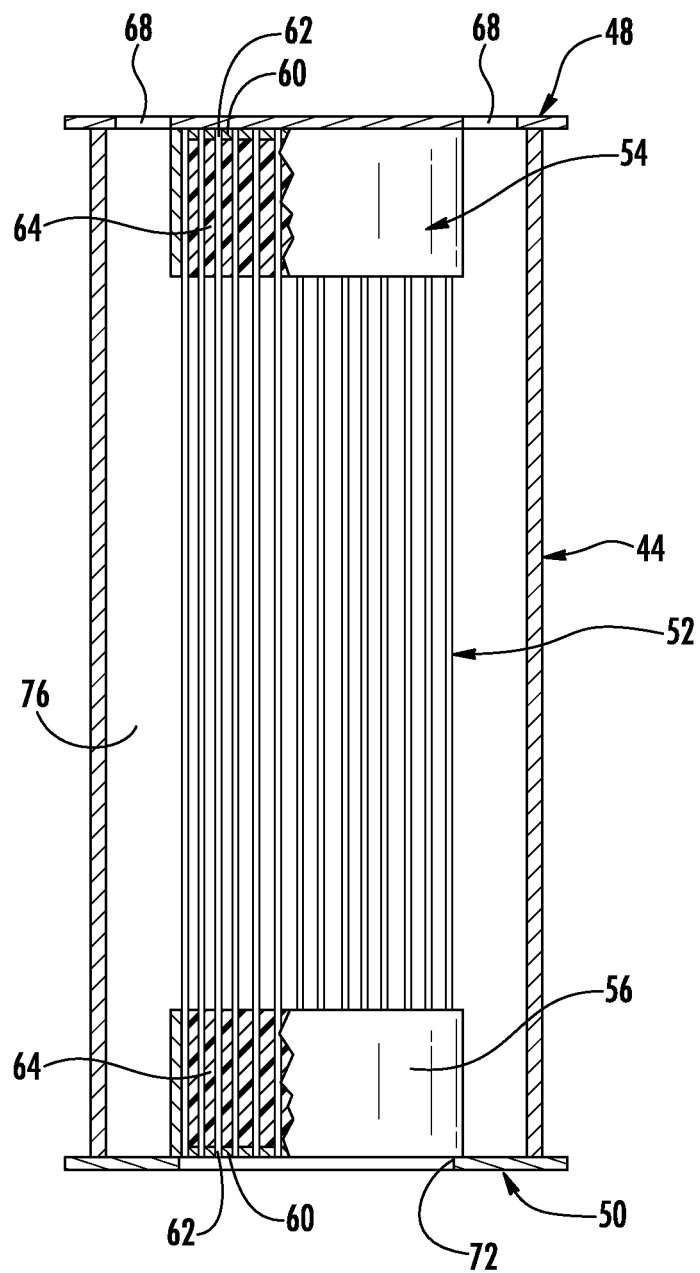
FIG. 3B is a longitudinal sectional view of the filter unit of FIG. 3.

As shown particularly in FIGS. 3, 3A and 3B, the filtration unit 14 may be in the form of a filter cartridge that includes an outer casing 44 defined by a circular side wall 46 circumscribing an axis. The side wall 46 includes an upper and lower end, the upper end of which has an upper end cap 48. The lower end is closed by a bottom end cap 50.

A filter media is in the form of a bundle of hollow fiber membranes 52 mounted in the casing 44. The hollow fiber membranes 52 have their upper and lower ends mounted in an upper and lower membrane cup 54 and 56 respectively. Each membrane cup 54 and 56 includes a cylindrical side portion 58 and a flat bottom portion 60 closing the bottom end of each cup 54 and 56. The bottom portion 60 of each of the cups 54 and 56 includes a series of perforations 62 therethrough. The hollow fiber membranes 52 initially have their ends extending through the perforations, but have them cut flush with the outside surface of the bottom portion 60 before being assembled into the casing. The upper and lower ends are embedded in a resin 64 in their respective membrane cup 54 or 56 to secure the membranes 52 to their respective cup.

The resin 64 may be any suitable non-porous water proof sealant such as a water proof silicon. The hollow fiber membranes 52 may be formed from the resins set for by way of example in U.S. Pat. No. 8,307,799, the disclosure of which is incorporated herein by reference in its entirety. The pores of the hollow fiber membrane may have a size between approximately 0.05 and 0.5 microns and, preferably, between 0.05 and 0.2 microns.

The upper and lower membrane cups 54 and 56 are sealingly attached to an upper and lower end cap 48 and 50 respectively. In the case of the upper end cap 48, such cap is generally flat and includes an inner portion 66 which covers the bottom of the upper membrane cup 54 thereby sealing the upper ends of the hollow fiber membranes. A plurality of circumferentially spaced openings 68 are provided in the upper end cap positioned radially outward of the outside surface cup portion 54. A plurality of fittings shown in the form of circumferentially spaced tabs 70 extend radially outwardly from the circumference of the end cap 54 as shown.

The bottom end cap 50, as shown in FIG. 3A, is generally flat with a central opening 72 therein resulting in the bottom of the membrane cup 56 and therefore the lower ends of the hollow fiber membranes 52 being exposed. The diameter of the opening 68 should be slightly less than the outer diameter of the lower membrane cup 56 to provide support for the membrane 56. The bottom end cap 50 is sealingly connected to the bottom membrane cup 56 so no fluid can leak between the outside of the membrane cup 56 and the end cap into the opening. As with the upper end cap 48, the bottom end cap 50 includes a plurality of circumferentially spaced tabs 74 each of which extends outwardly from the circumference of the end cap 50 as shown.

The upper and lower end caps 54 and 56 are sealed to the casing 44. This results in a chamber 76 being formed between the inner surface of the casing 44 and the bundle of hollow fiber membranes 52.

Figure 2:
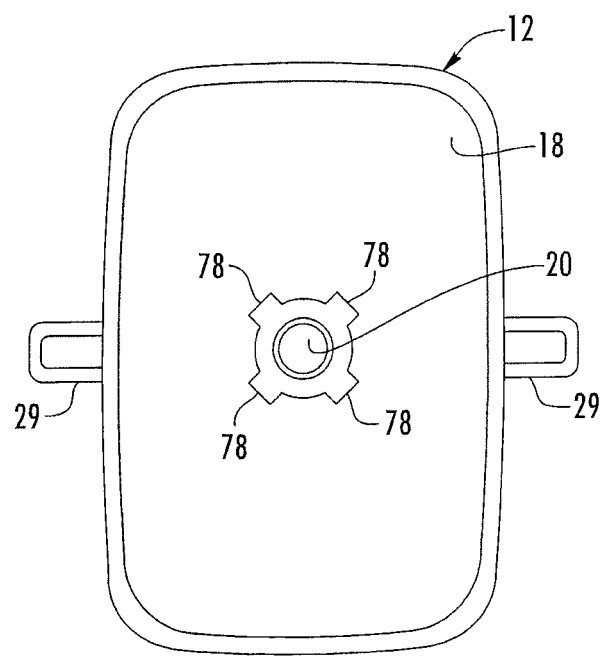
FIG. 2 is a view of the underside of the lid of the pitcher of FIG. 1.

Referring to FIGS. 2 and 5, the underside of the lid 12 is provided with a series of circumferentially spaced slots 78 that communicate with a groove 80 in the side wall of the fluid inlet 20. The slots 78 provide an opening for the tabs 70 on the upper end cap 48 to be inserted into the lid 12 and turned into the groove 80 to provide a bayonet connection between the upper end cap 48 of the filter cartridge 14 and the lid 12. An O-ring seal 82 is provided in a groove in the underside of the lid to seal against a sealing surface 84 on the upper surface of the end cap 48.

The filter cartridge 14 is adapted for the influent to enter the filter cartridge through the openings 68 in the upper end cap 48, pass into the chamber 76 of the filter cartridge 14 formed between the bundle of hollow fiber membranes 52 and the interior of the side wall 46 of the casing 44 and then into the membranes and out through the opening 72 in the bottom end cap 50.

In use, the filter cartridge 14 is attached to the lid of the reservoir by inserting the tabs 70 into the slots 78 of the underside of the lid 12 and twisting the filter cartridge 14 to secure the bayonet connection. With this arrangement, the filter cartridge 14 is sealed against the lid 12 and the lid 12 may be secured to the pitcher 4 by the clamps 29.

Other types of arrangements may be used to connect the filter cartridge to the lid. Threaded male and female members may be provided on the lid and filter cartridge. Also, a threaded ring may be provided between the two members that rotates in one direction tightening the fluid seal and rotates in the other direction to loosen the seal.

The assembled filter cartridge 14, lid 12 and pitcher 4 may then be attached to a source of fluid such as a faucet by means of the fluid sealing member 22 or other appropriate connection, such as an adapter that threads onto the pipe or faucet. The source of fluid may then be turned on, and the pressure of the incoming fluid will cause the fluid to flow through the opening 24 in the sealing member 22 of the lid 12, the openings 68 in the upper end cap 48 and into the chamber 76 between the hollow fiber membranes 52 and the interior surface of the side wall 46 of the casing 44. The influent under pressure will then pass through the walls of the hollow fiber membranes 52 into the interior thereof and then out through the bottom ends of the membranes through the bottom opening 72 in the bottom end cap 50. An orifice 25 may be included in the fluid inlet 20 for relieving a portion of the pressure from the fluid source through the filtration unit 14.

The plug 42 in the bottom of the handle 32 should be removed so that when the effluent flows into the reservoir 4 and fills the reservoir 4 up to the point of the opening into the handle 32, additional effluent will flow through the handle 32 and out the drain opening 40 thereby indicating that the pitcher has been filled and the source of incoming fluid can be shut off.

When the filtration unit 14 becomes clogged or dirty, it can be rejuvenated rather than discarded. To clean the filtration unit, the filter cartridge 14 can be unscrewed from the lid 12 and reversed, attaching the normally discharge end (or lower end as described above) to the underside of the lid 12 using the tabs 74 on the bottom end cap 50 to connect the bayonet connection. A fluid under pressure such as water from a faucet can be caused to flow into the filter unit through the opening 72 in the normally discharge end, whereby the fluid flows into the interior of the hollow fiber membranes and then out through the walls thereof into the channel 76 between the bundle of hollow fiber membranes 52 and the interior of the side wall 46 of the casing 44. The fluid will then flow out through the openings 68 in the influent or upper end cap 48, carrying along with it the filtered particles that have accumulated.

Figure 4:
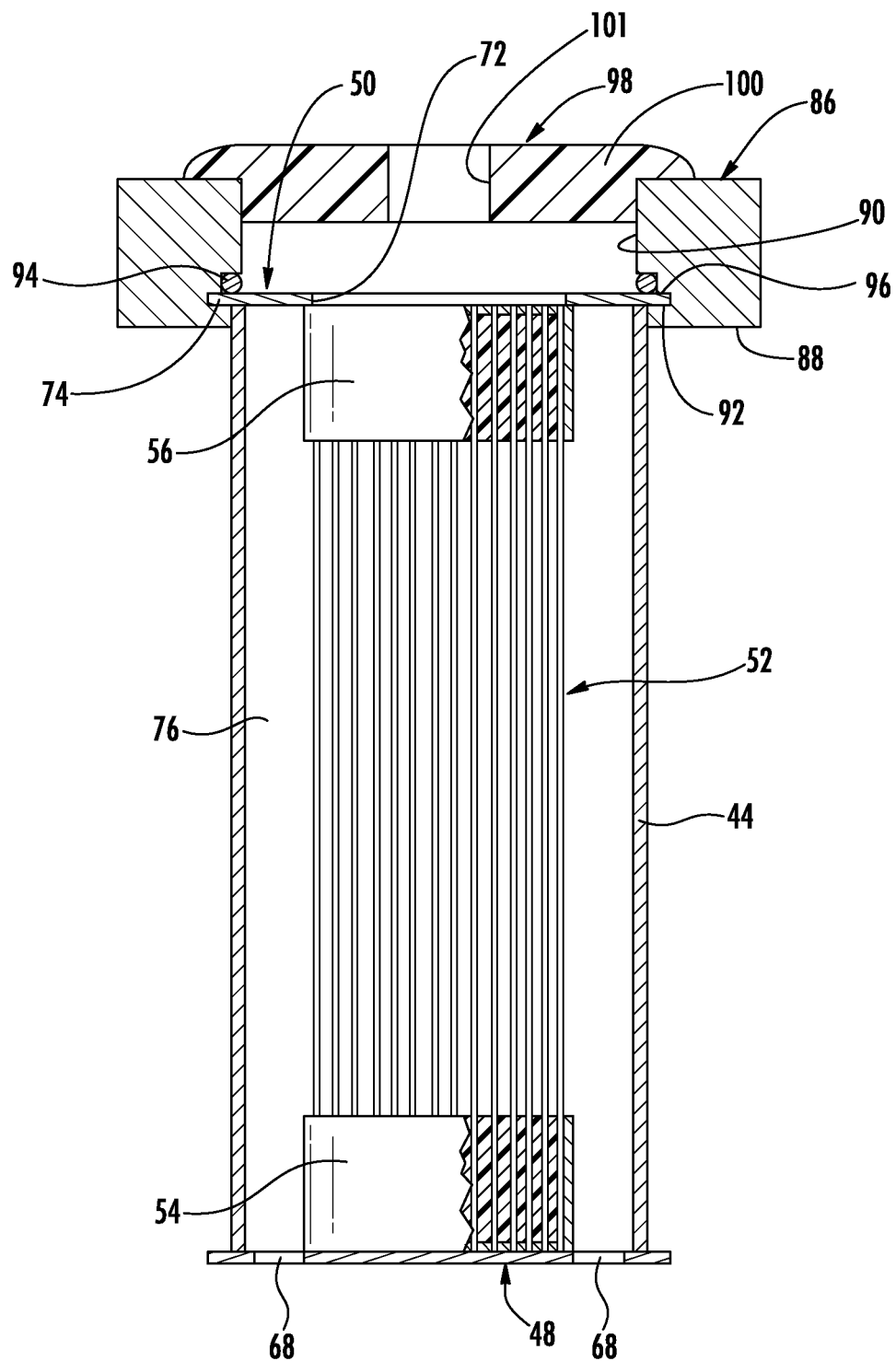
FIG. 4 is a depiction of a backwash attachment for filter rejuvenation as disclosed herein.

An alternative arrangement is shown in FIG. 4. In that arrangement, the filter cartridge 14 is removed from the lid of the pitcher for rejuvenation. A backwash adapter 86 is provided that includes a body 88 having an aperture 90 therein adapted to be sealingly connected to the normally discharge end of the hollow fiber membrane bundle 14. This connection may be similar to the connection between the filter cartridge and lid as described above. The connection may include a series of circumferentially spaced slots that communicate with groove 92 in the side wall of the opening of the body of the adapter. The slots provide an opening for the tabs 74 of the normally discharge end of the fluid cartridge to be inserted into the adapter and turned into the groove to provide a bayonet connection. An O-ring seal 94 is provided in a groove in the underside of the lower portion of the adapter to seal against a sealing surface 96 on the bottom end cap 56 of the filter cartridge.

The adapter includes a connector 98 to sealingly engage a source of a fluid under pressure such as a water faucet. This connection may be a rubber sealing grommet 100 with a central opening 101 mounted in the body 88 of the adapter as shown, a threaded connection or the like. With the connector 98 attached to a source of pressurized fluid such as a water faucet, when the water is turned on, water will be forced to flow into the normally effluent end of the cartridge 14, through the hollow fiber membranes, out through the walls thereof, into the chamber 76 and out through the opening 68 into upper end cap 48 removing the collected filtered particles.

Although the filter cartridge has been described as having the fluid to be filtered flow from the outside though the walls of the hollow fiber membranes into membranes and then out through the ends of the hollow membrane, the filter cartridge could be arranged to have the flow from the inside of the hollow fiber membranes out through the walls thereof.

Figure 6:
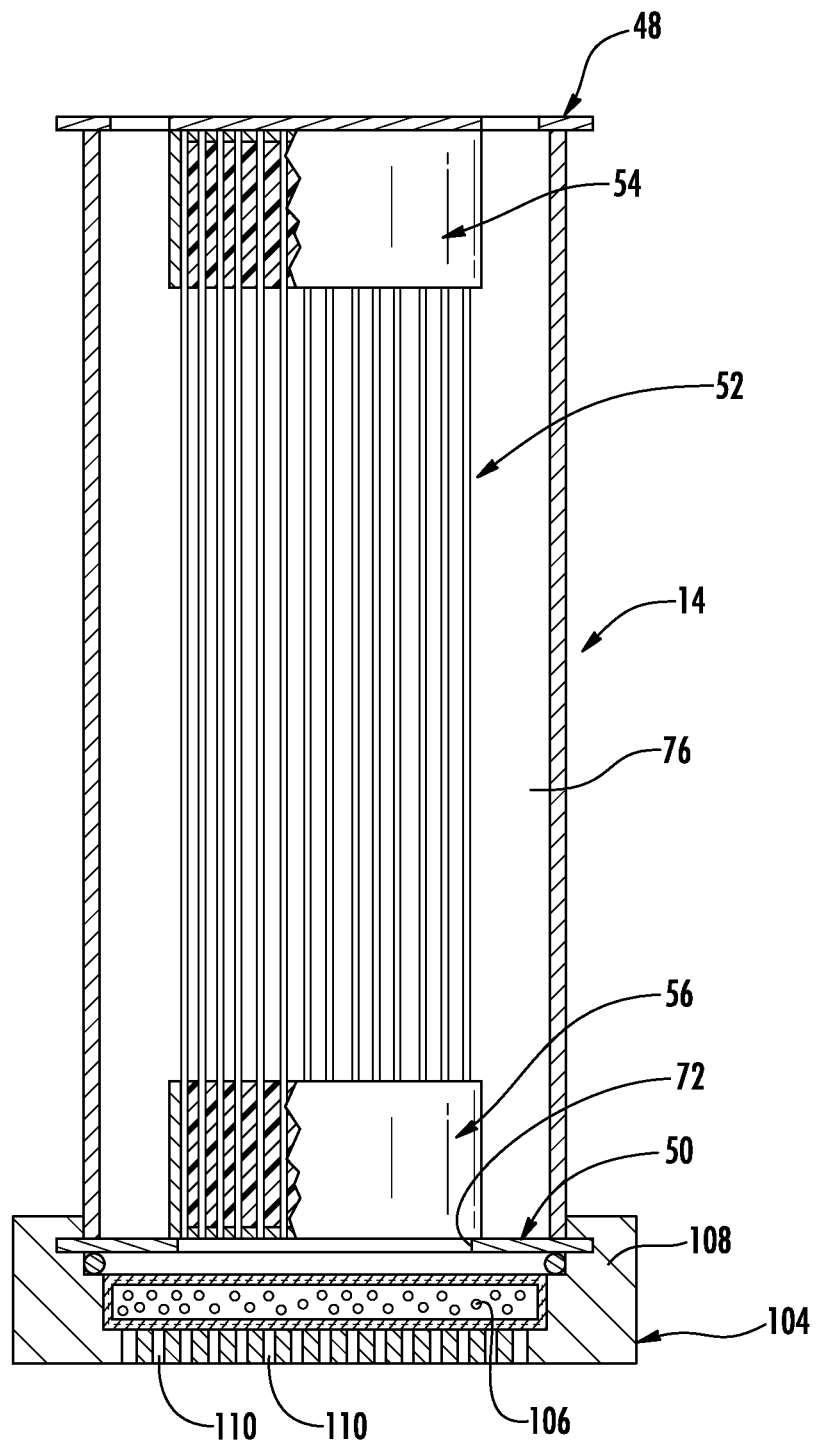
FIG. 6 is a cross-sectional view of another embodiment of the filter unit.

Further, as those skilled in the art understand, the filter cartridge and filtration unit is not limited to including hollow fibers only. Embodiments can exist that include a secondary filter media, such as activated carbon, in combination with hollow fibers such that fluid from a connected source may be filtered through both media. An example of such an embodiment is shown in FIG. 6 wherein a bottom unit 104 is shown containing a sack of activated charcoal 106 attached to the discharge end of the hollow membrane filter cartridge 14. The unit may include a cup-like container 108 in which a sack containing the activated charcoal is contained. The unit may be attached to bottom (effluent end) of the hollow fiber membrane filter cartridge 14 by means of a bayonet connection such as described in connection with the connection of the lid to the filter unit. The bottom of the cup-like container 108 has perforations 110 to allow the filtered fluid to exit the unit. Although the unit is shown attached to the effluent end, arrangements may be had that provide the charcoal unit to be positioned on the influent side of the hollow membrane filter cartridge.

With the above described arrangement, a filtration unit is provided in which the reservoir can be completely filled, the filter cartridge can be rejuvenated by being backwashed, and does not rely on gravity for filling the reservoir.

While specific embodiments have been set forth above for purposes of illustration, the foregoing description should not be deemed a limitation of the invention herein. Accordingly, various modifications, adaptations and alternatives may occur to one skilled in the art without departing from the spirit of the invention and scope of the claimed coverage.

What is claimed is:

1. A reversible fluid filtration system for filtering a material from a fluid, comprising:
    a receiver unit having a first side and an opposite side, and defining a fluid channel, the first side including a first sealing member configured for releasable engagement with a fluid delivery unit connected to a fluid source;
    a fluid filtration unit having a solid outer wall extending between a first end configured for removable mechanical attachment to the receiver unit via the second side and a second end, the first end having a first end cap defining openings and the second end having a second end cap defining openings that communicate with the filtration channel being defined between the first end cap and the second end cap and delimited by the outer wall, the holes in the first end cap communicated with the filtration channel and the holes in the second end cap communicating with the filtration channel, and a unit of filter media positioned between first and second end caps, the openings in the first end cap and openings in the second end cap being in fluid communication with the fluid channel when the first end is attached to the receiver unit,
    wherein
    the filter media comprises a plurality of hollow fiber membranes, each hollow fiber membrane in the plurality of hollow fiber membranes extending from an upper end at the first end cap of the fluid filtration unit to a lower end cap at the second end of the fluid filtration unit, with each of the hollow fiber membranes of the plurality of hollow fiber membranes contained between the first end cap and the second end cap and the upper ends of each of hollow fiber membranes of the plurality of hollow fiber membranes being covered and the lower ends of each of hollow fiber membranes of the plurality of hollow fiber membranes being open, when the first sealing member is engaged with the fluid delivery unit, the first end of the fluid filtration unit is attached to the receiver unit, and the fluid source is under pressure, the fluid from the fluid source is forced through the openings in the first end cap and through each of hollow fiber membranes of the plurality of hollow fiber membranes in the first relative direction and from the openings in the second end cap, causing the material present in the fluid to be filtered from the fluid by each of hollow fiber membranes of the plurality of hollow fiber membranes and leaving the material on each of hollow fiber membranes of the plurality of hollow fiber membranes, and the second end of the fluid filtration unit is configured for removable mechanical attachment to the receiver unit via the second side, thereby allowing the fluid filtration unit to be reversed with the second end of the fluid filtration unit attached to the receiver unit, whereupon fluid from the fluid source under pressure is forced through the openings in the second end cap and through each of the hollow fiber membranes of the plurality of hollow fiber membranes in a second relative direction opposite of the first relative direction and from the openings in the first end cap, thereby removing at least a portion of the material present on the each of the hollow fiber membranes of the plurality of hollow fiber membranes.

2. The reversible fluid filtration system of claim 1, wherein each of the end caps define a respective peripheral outer surface for independent mechanical mating with the receiver unit.

3. The reversible fluid filtration system of claim 1, wherein each of hollow fiber membranes of the plurality of hollow fiber membranes each have a wall defining an interior, and when the first end of the fluid filtration unit is attached to the receiver unit and fluid flows from the first end of the filtration unit to the second end of the filtration unit, fluid passes through each of the walls of each of hollow fiber membranes of the plurality of hollow fiber membranes into the interior thereof and then out from the interior via the exposed lower ends.

4. The reversible fluid filtration system of claim 3, wherein the pores in each of hollow fiber membranes of the plurality of hollow fiber membranes have a size between approximately 0.05 microns and approximately 0.2 microns.

5. The reversible fluid filtration system of claim 3, wherein the materials accumulate on each of hollow fiber membranes of the plurality of hollow fiber membranes when fluid is forced therethrough in the first direction, and at least a portion of the accumulated materials are removed from each of hollow fiber membranes of the plurality of hollow fiber membranes via fluid flowing in the second direction.

6. The reversible fluid filtration system of claim 1, wherein the first end of the fluid filtration unit and second end of the fluid filtration unit separately mechanically attach via mating with the second side of the receiver unit via a series of tabs and cooperative slots.

7. The reversible fluid filtration system of claim 1, wherein the filtration unit further comprises a unit of activated charcoal filter media.

8. The reversible fluid filtration system of claim 7, wherein said activated charcoal filter media is mounted downstream of said each of hollow fiber membranes of the plurality of hollow fiber membranes, when the first end of the filtration unit is attached to the receiver unit.

9. The reversible fluid filtration system of claim 1, wherein both of the first end of the filtration unit and the second end of the filtration unit and the second side of the receiver unit include cooperative male and female parts for said respective removable mechanical attachment.

10. The reversible fluid filtration system of claim 9, wherein the second end of the filtration unit comprises a male or female part that is substantially identical to the male or female part on the filtration unit first end.

11. The reversible fluid filtration system of claim 1, wherein the first end of the fluid filtration unit includes a series of circumferentially spaced tabs configured to mate with the second side of the receiver unit, and the second end of the fluid filtration unit includes a series of circumferentially spaced tabs configured to mate with the second side of the receiver unit.

12. The reversible fluid filtration system of claim 1, wherein the first end and second end each has a peripheral outer surface, and each respective peripheral outer surface comprises substantially identical attachment members configured for releasable fluid tight attachment to the second side of the receiver unit to allow the fluid filtration unit to be attached to the second side via either the first end or the second end, thereby fluidly connecting the fluid channel with the openings in the first cap and openings in the second cap through the filter media.

13. The reversible fluid filtration system of claim 1, wherein the receiver unit is part of a lid for a fluid storage and dispensing vessel.

14. The reversible fluid filtration system of claim 1, wherein the first end cap defines a plurality of openings in a radially outer portion, and each of hollow fiber membranes of the plurality of hollow fiber membranes extends from a covered radially inner portion of the first end cap that is inward of said openings.

15. The reversible fluid filtration system of claim 14, wherein the second end cap defines a plurality of openings in a radially inner portion and a solid radially outer portion, and each of hollow fiber membranes of the plurality of hollow fiber membranes extend from the radially inner portion of the second end with the lower ends of each of hollow fiber membranes of the plurality of hollow fiber membranes in communication with the openings in the radially inner portion.

16. A reversible fluid filtration system for filtering a material from a fluid, comprising:
a receiver unit defining a fluid channel extending from a first side to a second side and a fluid inlet on the first side connected to the fluid channel; and a filtration unit comprising
a solid side wall circumscribing an axis defining a flow chamber, the side wall extending between and sealingly connected to each of a first perforate end cap and a second perforate end cap; and
a plurality of porous hollow fiber membranes positioned within the flow chamber in fluid communication with the perforate portions of the first and second end caps, each of the hollow fiber membranes in the plurality of porous hollow fiber membranes extending from a upper end that is attached to the first perforate end cap and covered by a solid portion of the first perforate end cap to a lower end that is attached to the second end cap and open; wherein the first and second end caps each includes a sealing member and each of the first and second end caps is respectively configured for independent releasable fluid tight attachment to be mechanically maintained from above in the axial direction by the receiver unit via the second side, such that the filtration unit may be fluidly connected to the fluid inlet through the fluid channel via either the first or second end cap, thereby fluidly connecting the inlet with the perforate portions of the attached end cap and the perforate portions of the opposite end cap through each of hollow fiber membranes of the plurality of porous hollow fiber membranes, and wherein when the first end cap is attached to the receiver unit and fluid is forced from a fluid source through the fluid channel under pressure, the fluid from the fluid source is forced through the first end cap and through each of hollow fiber membranes of the plurality of porous hollow fiber membranes in the first relative direction and out from the second perforate end cap, causing the material present in the fluid to be filtered from the fluid by each of the hollow fiber membranes of the plurality of porous hollow fiber membranes and the material to build up on each of hollow fiber membranes of the plurality of porous hollow fiber membranes, and detachment of the first end cap from the receiver unit, reversal of the filtration unit, attachment of the second end cap to the receiver unit and forcing fluid from the fluid source through the second end cap and through the fluid channel under pressure forces fluid through each of hollow fiber membranes of the plurality of porous hollow fiber membranes in the second relative direction opposite from the first relative direction, thereby removing at least a portion of material present on each of hollow fiber membranes of the plurality of porous hollow fiber membranes.

17. A reversible fluid filtration system for filtering a material from a fluid, comprising:

a receiver unit having a first side and an opposite second side, and defining a fluid channel, the first side including a first sealing member configured for releasable engagement with a fluid delivery unit connected to a fluid source;

a fluid filtration unit extending in an axial direction between and connected to a first end cap and a second end cap, a fluid filtration channel defined by an outer cylindrical wall between the respective end caps, the first end cap having an outer area portion with openings and an inner area portion that is solid, the second end cap having an outer area portion that is solid and an inner area portion with openings, the fluid filtration unit including filter media comprising a plurality of hollow fiber membranes extending from the solid inner area portion of the first end cap with an upper end of the plurality of hollow fiber membranes covered to the inner area portion of the second end cap with openings with the lower end of the plurality of hollow fiber membranes fluidly exposed, the first end cap openings being fluidly connected to the second end cap openings through the fluid filtration channel, wherein the first end cap and second end cap are each configured to independently mechanically attach to the receiver unit via the second side thereby forming a substantially fluid tight connection between the fluid channel and the respective openings in the first end cap and second end cap through the fluid filtration channel when either of the first end cap or the second end cap is attached to the receiver unit, wherein when the first end cap is attached to the receiver unit and fluid is forced from a fluid source through the fluid channel under pressure, the fluid from the fluid source is forced through the first end cap and the plurality of hollow fiber membranes in the first relative direction and from the openings in the second end cap, causing the material present in the fluid to be filtered from the fluid by the plurality of hollow fiber membranes, and when the second end cap is attached to the receiver unit and the first sealing member is engaged with the fluid delivery unit and fluid is forced from the fluid delivery unit under pressure, the fluid from the fluid source is forced through the second end cap and through the plurality hollow fiber membranes in a second relative direction opposite from the first relative direction and from the openings in the first end cap, thereby removing at least a portion of material present on the plurality of hollow fiber membranes.

18. The reversible fluid filtration system of claim 3, wherein when the second end of the fluid filtration unit is attached to the receiver unit and fluid flows from the second end of the filtration unit to the first end of the fluid filtration unit, flows into the interior of each of the hollow fiber membranes of the plurality of hollow fiber membranes and then out of the walls each of the hollow fiber membranes of the plurality of hollow fiber membranes thereof.

19. The reversible fluid filtration system of claim 16, wherein each of the first and second end caps of the filtration unit is mechanically maintained by the receiver unit via a bayonet connection when attached to the receiver unit.

20. The reversible fluid filtration system of claim 17, wherein each of the first and second end caps of the filtration unit is mechanically attached to the receiver unit via a bayonet connection when attached to the receiver unit.

* * * * *